(12) United States Patent
Hamilton et al.

(10) Patent No.: US 8,241,419 B2
(45) Date of Patent: Aug. 14, 2012

(54) FIBER CEMENT BOARD WITH MODIFIED FIBER

(75) Inventors: Robert T Hamilton, Seattle, WA (US); David J O'Callaghan, Bonney Lake, WA (US); Hugh West, Seattle, WA (US)

(73) Assignee: Weyerhaeuser NR Company, Federal Way, WA (US)

( * ) Notice: Subject to any disclaimer, the term of this patent is extended or adjusted under 35 U.S.C. 154(b) by 362 days.

(21) Appl. No.: 12/475,172

(22) Filed: May 29, 2009

(65) Prior Publication Data

US 2010/0300330 A1   Dec. 2, 2010

(51) Int. Cl.
*C04B 16/02* (2006.01)
(52) U.S. Cl. .......... 106/644; 106/730; 428/703; 52/344; 156/39

(58) Field of Classification Search .................. 106/644, 106/730; 428/703; 52/344; 156/39
See application file for complete search history.

(56) References Cited

U.S. PATENT DOCUMENTS

| 6,676,745 | B2 | 1/2004 | Merkley et al. |
| 7,344,593 | B2 | 3/2008 | Luo et al. |
| 2006/0117655 | A1* | 6/2006 | Bodycomb et al. ............ 47/59 S |

\* cited by examiner

*Primary Examiner* — Paul Marcantoni
(74) *Attorney, Agent, or Firm* — John M. Crawford

(57) ABSTRACT

A building material product comprising a cementitious binder, an aggregate and cellulose reinforcing fibers wherein the cellulose reinforcing fibers have been treated with oil which is bound to the fiber by a retention aid. The resulting fiber when included in a fiber cement composite results in improved deflection of the composite at peak loading as well as improved impact strength while maintaining overall board strength.

10 Claims, 3 Drawing Sheets

FIBER CEMENT BOARD WITH MODIFIED FIBER

This relates to a fiber cement board which incorporates a modified cellulose pulp fiber.

BACKGROUND

The internal structures of houses and other buildings are commonly protected from environmental elements by exterior siding materials. These siding materials are typically planks or panels composed of wood, concrete, brick, aluminum, stucco, wood composites, or fiber-cement composites. Some common fiber-cement composites are fiber-cement siding, roofing, and trim which are generally composed of cement, silica sand, unbleached wood pulp, and various additives. Fiber-cement products offer several advantages over other types of materials, such as wood siding, because they are weatherproof, relatively inexpensive to manufacture, fire-resistant, and invulnerable to rotting or insect damage.

Most commercial fiber-reinforced cement siding products are made using the Hatsheck process. The Hatsheck process was initially developed for the production of asbestos composites, but it is now used for the manufacture of non-asbestos, cellulose fiber reinforced cement composites. In this process, bales of unbleached cellulose pulp fibers are re-pulped in water to provide substantially singulated fibers. The re-pulped fibers are refined and then mixed with cement, silica sand, clay, and other additives to form a mixture. The fiber-cement mixture is deposited on a felt band substrate, vacuum dewatered, layered and in some cases pressed, and then cured to form a fiber reinforced cement matrix in sheet form. The form may have the appearance of standard beveled wood siding.

Other commonly used fiber cement manufacturing processes known to those skilled in the art are: the Magnani process, extrusion, injection molding, hand lay-up, molding and the Mazza pipe process.

Cellulose pulp fibers have two roles in the manufacture of fiber cement products.

Cellulose pulp fibers act as a filter medium in the cement mixture slurry during the drainage process on the forming wire to help retain cement and silica particles while the excess water is being removed from the cement suspension. If there is no filter medium then a great deal of the solids from the slurry will be lost with the water during the drainage process. The purpose of the filter medium is to retain the cement mixture within the product while removing the water.

The fibers also reinforce the cement product. The fiber cement board manufacturers want good strength and good flexibility in the cement board. Strength is indicated by the modulus of rupture of the board. Flexibility is shown by the deflection of the board at maximum load. Maximum load is the amount of force that can be applied to the board before it breaks. Deflection at maximum load is how far the board deflects from the horizontal plane of the board before breaking in three point bending.

A standard against which other cellulose chemical pulp fibers are measured is the Douglas fir unbleached chemical pulp fiber. Other fibers must be comparable with Douglas fir unbleached chemical pulp fiber in modulus of rupture, maximum load and deflection at maximum load if they are to be considered for use in fiber cement board.

Fiber cement boards made with bleached cellulose pulp fibers usually have high strength but are brittle, resulting in poor flexibility. These boards tend to break if flexed and also tend to break when nailed. It would be advantageous to provide a fiber cement board made with bleached cellulose chemical pulp fibers that exhibits both high strength and good flexibility.

DESCRIPTION

Figure 1:
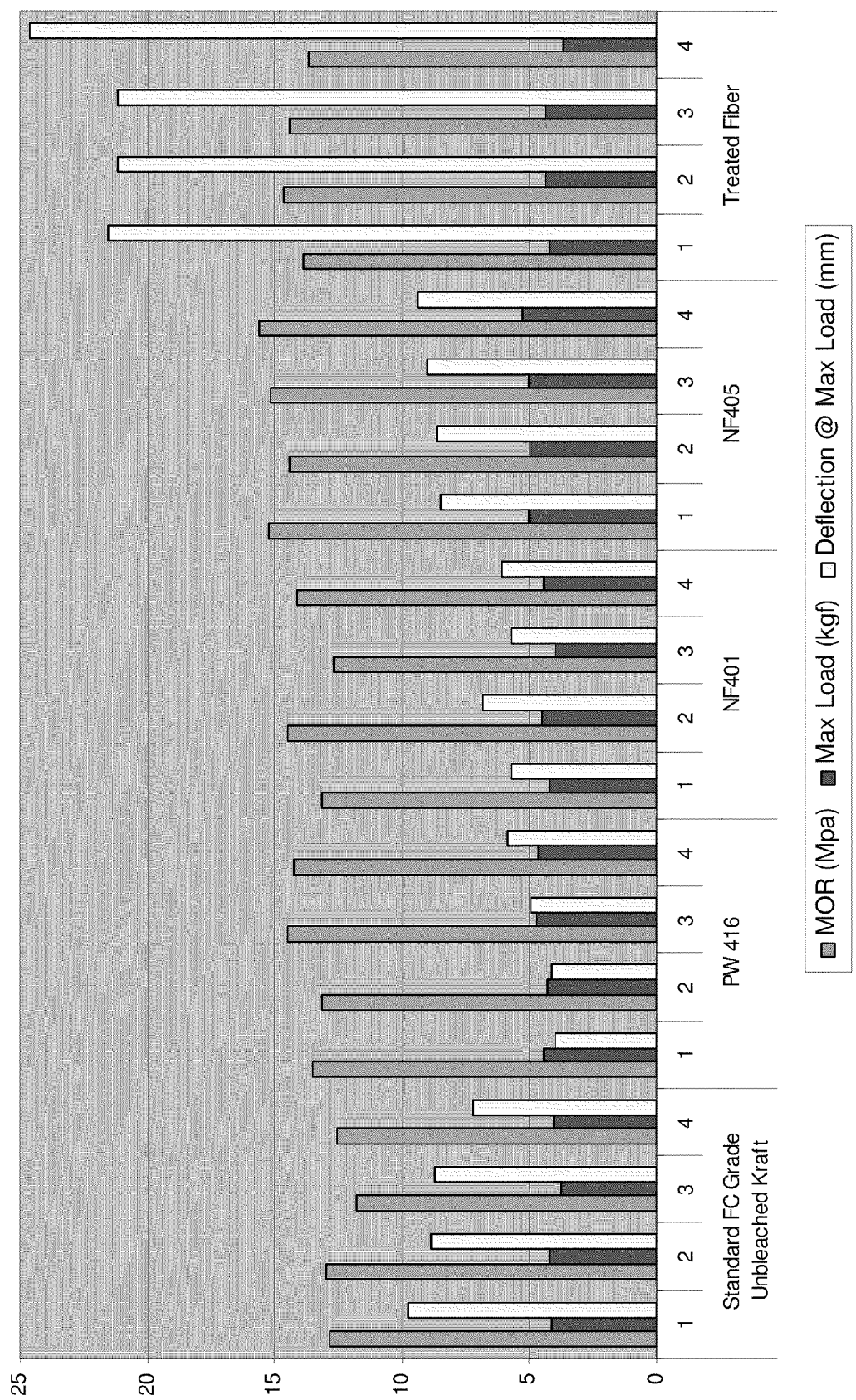
FIG. 1 is a graph comparing the modulus of rupture, maximum load and deflection at maximum load for fiber cement boards with different cellulose pulp fibers.

The fiber cement boards of the present invention may be manufactured by any of a number of processes. Typical processes are the Hatsheck process, the Magnani process, extrusion, injection molding, hand lay-up, molding and the Mazza pipe process.

In the manufacture of fiber cement board, bales of cellulose pulp fibers are re-pulped in water to provide substantially singulated fibers. The re-pulped fibers are refined and then mixed with cement, silica sand, and other additives to form a mixture. The mixture is then formed into a fiber cement board. In one process the fiber-cement mixture is deposited on a felt band substrate, vacuum dewatered, and cured to form a fiber reinforced cement matrix in sheet form. The sheets may take the form of standard beveled wood siding. They may also take the form of building sheets, panels, planks and roofing.

The usual composition of the fiber cement board is 10 to 90% by weight cement, 20 to 80% by weight silica sand, and 2 to 18% by weight cellulose pulp fibers. The other additives that are usually found in the fiber cement board are: density modifiers, weight modifiers, flame retardants, clay, kaolin, metakaolin, silica fume, fly ash, defoamers, viscosity modifiers, light weight aggregates, perlite, vermiculite, mica, pumice, ash, flocculants, alum, alumina trihydrate, waterproofing agents, wollastonite, calcium carbonate, resins, pigments, diatomaceous earth and resins.

The proportion of the cementitious binder, aggregate, density modifiers, and additives can be varied to obtain optimal properties for different applications, such as roofing, deck, fences, paving, pipes, siding, trim, soffits, backer for tile underlayment. For an air-cured product, a higher percentage of cement can be used, more preferably about 60-90%. In an air-cured embodiment, the fine ground silica is not used, although silica may be used as a filler.

The cementitious binder is preferably Portland cement but can also be, but is not limited to, high alumina cement, lime, high phosphate cement, and ground granulated blast furnace slag cement, or mixtures thereof. The aggregate is preferably ground silica sand but can also be, but is not limited to, amorphous silica, micro silica, silica fume, diatomaceous earth, coal combustion fly and bottom ashes, rice hull ash, blast furnace slag, granulated slag, steel slag, mineral oxides, mineral hydroxides, clays, magnasite or dolomite, metal oxides and hydroxides and polymeric beads, or mixtures thereof.

The density modifiers can be organic and/or inorganic lightweight materials. The density modifiers may include plastic hollow materials, glass and ceramic materials, calcium silicate hydrates, microspheres, and volcano ashes including perlite, pumice, shirasu balloons and zeolites in expanded forms. The density modifiers can be natural or synthetic materials. The additives can include, but are not limited to, viscosity modifiers, fire retardants, waterproofing agents, silica fume, geothermal silica, thickeners, pigments, colorants, plasticizers, forming agents, flocculents, drainage aids, wet and dry strength aids, silicone materials, aluminum powder, clay, kaolin, alumina trihydrate, mica, metakaolin, calcium carbonate, wollastonite, and polymeric resin emulsion, or mixtures of thereof.

Usually unbleached Douglas fir chemical pulp fibers are used in the manufacture of fiber cement board. These have been found in the industry to provide the best combination of modulus of rupture, maximum load and deflection at maximum load.

If unbleached Douglas fir cellulose pulp fibers are in short supply then it is necessary to find other pulp fibers that can be used. Usually other unbleached cellulose pulp fibers having lengths similar to Douglas fir have been used. Redwood is an example.

Bleached softwood chemical pulp fibers have been considered because of their length but have not been used because they tend to result in brittle boards. They tend to have strength that is the same or slightly higher than unbleached Douglas fir chemical pulp fiber but usually have flexibility that is far less than unbleached Douglas fir chemical pulp fibers.

The present invention can utilize a number of pulp fibers. Coniferous and broadleaf species can be used. These are also known as softwoods and hardwoods. Softwoods would normally be used because they have longer fibers than hardwoods. Typical softwood species are spruce, fir, hemlock, tamarack, larch, pine, cypress and redwood. Typical hardwood species are ash, aspen, cottonwood, basswood, birch, beech, chestnut, gum, elm, maple and sycamore. Recycled cellulosic material can be used as starting material for the fibers. The present invention can use chemical, mechanical, thermomechanical and chemithermomechanical pulp. Kraft, sulfite and soda chemical pulps can be used. The fibers can be bleached or unbleached. The present invention can be used with unbleached Douglas fir chemical pulp fibers.

Usually, softwood or coniferous species will be used because of fiber length. Hardwood or broadleaf species have a fiber length of 1-2 mm. Softwood or coniferous species have a fiber length of 3.5 to 7 mm. Douglas fir, grand fir, western hemlock, western larch, and southern pine have fiber lengths in the 4 to 6 mm range. Pulping and bleaching may reduce the average length slightly because of fiber breakage.

In the manufacture of pulp woody material is disintegrated into fibers either in a chemical or mechanical type process. The fibers can then be optionally bleached. The fibers are then slurried with water in a stock chest, The slurry then passes to a headbox and is then placed on a wire, dewatered and dried to form a pulp sheet. Additives may be combined with the fibers in the stock chest, the headbox or both. Materials may also be sprayed on the pulp sheet before, during or after dewatering and drying.

The fibers of the present invention are treated with two materials in either the stock chest or the headbox.

The first material is an oil. The oil can be either a vegetable oil or a mineral oil. The oil is in globule form. It may be treated with a surfactant in order to form the globules and to provide the anionic character. One such vegetable oil additive is Eka Soft F60. In use Eka Soft F60 is diluted with at least 20 times its volume of warm water at 30 to 40° C. and added to the thick stock in a stock chest. The amount of oil added to the pulp is two to five kg of oil per ton of bleached sulfate pulp and one to three kg of oil per ton of bleached sulfite pulp.

Other vegetable oils that might be used would be any vegetable oil that is liquid at the drying temperature of pulp, around 100° C. Vegetable oils that might be used could include, among others, apricot oil, argan oil, artichoke oil, babassu oil, ben oil, bladder pod oil, Borneo tallow nut oil, bottle gourd oil, buffalo gourd oil, canola oil, carob pod oil, caster oil, coconut oil, copaiba oil, corn oil, cottonseed oil, crambe oil, cuphea oil, false flax oil, flaxseed oil, grapeseed oil, hempseed oil, honge oil, jatropha oil, jojoba oil, kapok seed oil, mango oil, meadowfoam seed oil, milk bush oil, mustard oil, okra seed oil, olive oil, nut oils, palm oil, palm kernel oil, peanut oil, petroleum nut oil, quinoa oil, radish oil, ramtil oil, rapeseed oil, rice bran oil, sesame oil, soybean oil, and tall oil.

The other material is a cationic retention aid which attaches the oil globules to the pulp fibers. The retention aid can be a cationic polymer such as a polyamide, polyacrylamide or polyethylenimine. One such retention aid is Eka Soft F50. The retention aid is added after the oil to allow the globules of oil to be mixed with the cellulose fibers before being attached to the fibers. In making hand sheets the retention aid was added about 6 minutes after adding the oil. In the stock chest it could be added at the fan pump. A cationic retention aid will attach to the anionic sites on the cellulose fiber and the anionic sites on the oil globule. The amount of retention aid can be from 0.25 to 3.0 kg of retention aid per tonne of cellulose fiber.

Other retention aids that can be used can be organic retention aids such as polyacrylamides, polyamines, polyethylenimines, polyamidoamines, polyethylene oxides, polyionenes and polypyrrolidinium derivatives. Another retention aid could be a cationic starch. Inorganic retention aids could be aluminum sulphate or papermakers alum, polyaluminum chloride, sodium aluminate. Another inorganic retention aid could be an alkaline activated bentonite in conjunction with nonionic high molar mass polyacrylamides.

A fiber cement board which incorporates a bleached pulp fiber treated with globules of anionic oil that have been attached to the fibers by a retention aid, has a modulus of rupture that is comparable to a fiber cement board that incorporates an unbleached Douglas fir chemical pulp fiber or a fiber cement board that incorporates a bleached fiber treated with a quaternary ammonium dispersant, and has a deflection at maximum load that is much higher than a fiber cement board that incorporates unbleached Douglas fir chemical pulp fiber or a fiber cement board that incorporates a bleached fiber treated with a quaternary ammonium dispersant. The deflection of the oil boards with oil treated fibers could be more than double either of the other boards. The impact strength of the boards with oil treated fibers could be almost double that of the boards with bleached fiber or the boards with bleached fiber treated with a quaternary ammonium dispersant and approximately 25% higher than boards with the standard unbleached Douglas fir fiber.

It has been found that a fiber cement board which incorporates a bleached pulp fiber treated with the globules of anionic vegetable oil that have been attached to the fibers by a retention aid, has a modulus of rupture that is comparable to a fiber cement board that incorporates an unbleached Douglas fir chemical pulp fiber or a fiber cement board that incorporates a bleached fiber treated with a quaternary ammonium dispersant, and, surprisingly, has a deflection at maximum load that is much higher than a fiber cement board that incorporates unbleached Douglas fir chemical pulp fiber or a fiber cement board that incorporates a bleached fiber treated with a quaternary ammonium dispersant. In some instances the deflection is more than double either of the other boards. It was also found that the impact strength of the boards with oil treated fibers was almost double that of the boards with bleached fiber or the boards with bleached fiber treated with a quaternary ammonium dispersant and approximately 25% higher than the boards with standard unbleached Douglas Dir fiber.

The boards with oil treated fiber can have a flexure extension of greater than 30 mm, and even 40 or more mm, as compared with a flexure extension of less than 30 mm, or even less than 20 mm, for a board with bleached fibers.

While not wishing to be bound by theory, it is believed that the reason the higher deflection is obtained is that the larger globules coat the entire fiber and allow the fiber to move with respect to the cement board in the fiber cement board. This maximizes the frictional force energy of the fiber within the matrix instead of binding it tightly to the matrix resulting in the tensile strength of the fiber becoming the only component to resist the load. This allows the fiber cement board to have a greater deflection than a fiber which attaches to the cement in the fiber cement board. The cement fiber board incorporating bleached fiber treated with globules of vegetable oil which have been attached with a retention aid can have a deflection that is at least twice the deflection of a fiber cement board incorporating unbleached Douglas fir chemical pulp fiber, This is borne out in the following table. The following table compares the modulus of rupture, maximum load and deflection at maximum load for several fiber cement boards. The only difference in the boards and the method of manufacturing the boards is the fiber incorporated into the fiber cement board. The fibers are a control, a standard fiber cement grade unbleached kraft which is unbleached Douglas fir kraft pulp, and several bleached kraft fibers. The bleached kraft fibers are PW416 which is bleached untreated southern pine kraft pulp from the Port Wentworth, Ga., Weyerhaeuser pulp mill; NF401 which is a bleached southern pine kraft pulp from the Weyerhaeuser New Bern, N.C., pulp mill which was treated with ~0.15% Ekasoft 509HA debonder; and NF405 which is a bleached southern pine kraft pulp from the Weyerhaeuser New Bern, N.C., pulp mill which was treated with ~0.25% Ekasoft 509HA debonder, and a bleached southern pine pulp fiber, a Treated fiber of the invention, treated with an anionic vegetable oil Eka Soft F60 and a cationic retention aid Eka Soft F50. The bleached fibers are comparable except for the treatment of the fiber, whether the fibers have been treated and the material used to treat the fiber.

The following samples were made using a hand sheet mold, they were dewatered using vacuum and pressed. The mix design used follows the accepted industry practice of approximately 30 to 40% cement with 50 to 60% silica and between 4 to 12% cellulose fiber by weight. Small percentages of clay and additives were added to aid in board formation. The samples were cured in an autoclave and were then conditioned for testing. The boards were measured for thickness to make sure all boards were within tolerance for comparative testing. The sample strips were cut for testing and were tested for MOR, Deflection and Max Load using three point bending. Notched IZOD testing was also undertaken to measure the impact strength of the boards.

| Fiber | | MOR (MPa) | Max. load (kgf) | Deflection at maximum load (mm) | Impact Strength (lb·ft/in$^2$) |
|---|---|---|---|---|---|
| Unbleached Douglas fir | 1 | 12.83 | 4.15 | 9.731 | |
| | 2 | 12.99 | 4.23 | 8.892 | |
| | 3 | 11.81 | 3.78 | 8.733 | |
| | 4 | 12.53 | 4.05 | 7.203 | |
| | Avg. | 12.54 | 4.05 | 8.640 | 0.98 |
| PW416 | 1 | 13.52 | 4.4 | 3.966 | |
| | 2 | 13.12 | 4.27 | 4.137 | |
| | 3 | 14.47 | 4.72 | 4.93 | |
| | 4 | 14.29 | 4.65 | 5.834 | |
| | Avg. | 13.85 | 4.51 | 4.717 | 0.64 |
| NF401 | 1 | 13.16 | 4.2 | 5.679 | |
| | 2 | 14.47 | 4.47 | 6.845 | |
| | 3 | 12.72 | 4. | 5.74 | |
| | 4 | 14.11 | 4.43 | 6.066 | |
| | Avg | 13.62 | 4.23 | 6.083 | 0.70 |
| NF405 | 1 | 15.26 | 5.05 | 8.52 | |
| | 2 | 14.39 | 4.93 | 8.61 | |
| | 3 | 15.17 | 5.06 | 9.01 | |
| | 4 | 15.63 | 5.24 | 9.39 | |
| | Avg. | 15.13 | 5.07 | 8.83 | 0.73 |
| Treated fiber | 1 | 13.91 | 4.21 | 21.58 | |
| | 2 | 14.62 | 4.37 | 21.16 | |
| | 3 | 14.44 | 4.38 | 21.19 | |
| | 4 | 13.65 | 3.65 | 24.65 | |
| | Avg. | 14.16 | 4.15 | 22.15 | 1.22 |

The fiber cement boards which incorporate bleached pulp fibers have a higher modulus of rupture and a higher maximum load than the fiber cement boards that incorporate unbleached Douglas fir chemical pulp fibers but only one, the fiber cement board incorporating NF405, has a deflection that is comparable to the boards incorporating Douglas fir fibers. The other boards incorporating bleached fibers have a deflection that is one-half to three-quarters that of the boards incorporating Douglas fir fibers.

The board with oil treated fiber had an MOR and maximum load that was equivalent to the board with Douglas fir fiber but had a deflection that was two and a half times that of the board with Douglas fir fiber. This can be explained if we consider that bleached fibers are bound far more tightly by the cement matrix than the unbleached. The impact strength of the board with oil treated fibers has improved over the standard fiber by almost 25%. The boards with oil treated fibers exhibits higher impact strength than all of the boards with bleached fibers as well as the boards with standard Douglas Fir fiber.

FIG. 1 is a graphic representation of the information in the table. The board using standard unbleached kraft fiber shows a good combination of MOR and deflection at max load. Boards with PW416, an untreated bleached southern pine kraft pulp fiber, have an increase in strength but a decrease in deflection at max load. Boards with NF401 or NF405, debonded southern pine kraft pulp fibers, have an increase in the flexibility of the board while maintaining the overall strength. Boards with the oil treated fiber are significantly different from the boards with the NF401 fiber or the NF405 fiber in that the strength of the board with the oil treated fiber is on par with that of boards with the standard unbleached kraft pulp fiber but the deflection at maximum load is almost two and a half times that of the board with either the standard fiber or the NF405.

Figure 2:
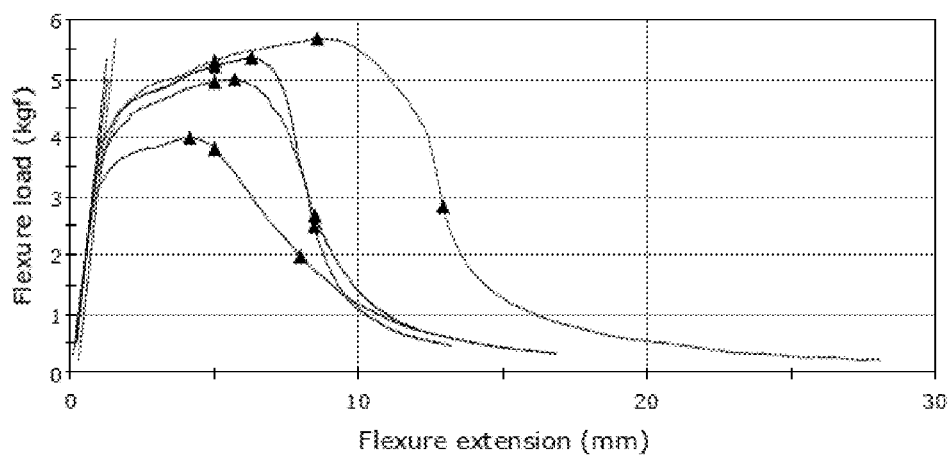
FIGS. 2 and 3 are charts of deflection curves of a bleached fiber and the oil treated bleached fiber.
Figure 3:
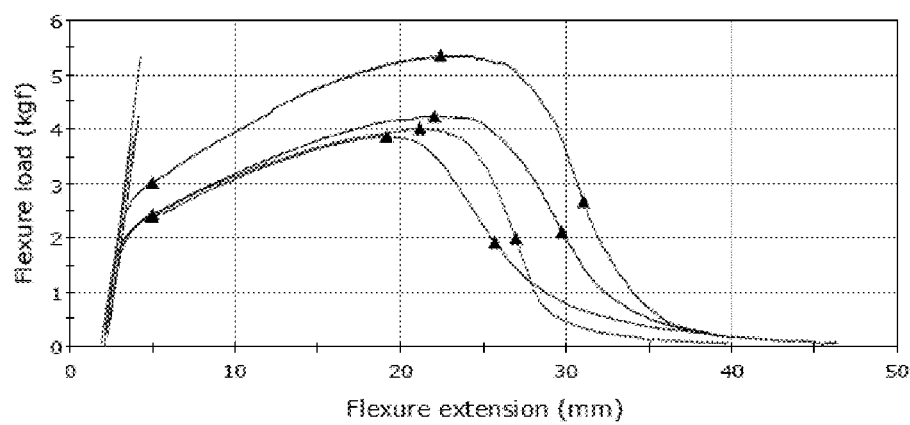

FIGS. 2 and 3 are graphs of flexure load vs. flexure extension. The boards were formed as described above. FIG. 2 is a board using an untreated bleached southern pine fiber. FIG. 3 is a board using an oil treated fiber. There were four samples for each board. The graphs show the effect of the treatment which has altered the bond between the fiber and the cement matrix in such a way as to allow the treated fiber to pulled out of the matrix rather than being broken as in the case of the bleached fiber. The flexure at maximum load and maximum flexure for the board with oil treated fiber is greater than for the other boards.

The invention claimed is:

1. A fiber cement board comprising a cementitious binder, an aggregate and cellulose reinforcing fibers wherein the cellulose reinforcing fibers have been treated with oil which is bound to the fiber by a retention aid prior to the addition of the fibers to the cementitious binder.

2. The fiber cement board of claim 1 wherein the cellulose fiber is a cellulose chemical pulp fiber.

3. The fiber cement board of claim 2 wherein the pulp fiber is a bleached pulp fiber.

4. The fiber cement board of claim 1 wherein the cellulose fiber is a wood or chemical wood pulp fiber other than Douglas fir or redwood.

5. The fiber cement board of claim 1 wherein the oil is vegetable oil in the form of globules.

6. The fiber cement board of claim 1 wherein the oil is a mineral oil in the form of globules.

7. The fiber cement board of claim 1 wherein the oil is in the form of globules which are anionic and the retention aid is cationic.

8. The fiber cement board of claim 1 wherein the retention aid is selected from the group consisting of polyacrylamides, polyamines, polyethylenimines, polyamidoamines, polyethylene oxides, polyionenes and polypyrrolidinium derivatives, cationic starch, aluminum sulphate or papermakers alum, polyaluminum chloride, sodium aluminate, or an alkaline activated bentonite in conjunction with nonionic polyacrylamides, or combinations thereof.

9. A fiber cement board comprising a cementitious binder, an aggregate and cellulose reinforcing fibers wherein the product has a flexure extension at maximum load of greater than 20 mm.

10. A fiber cement board comprising a cementitious binder, an aggregate and cellulose reinforcing fibers wherein the product has a maximum flexure extension of greater than 30 mm.

* * * * *